United States Patent [19]
Bailey et al.

[11] Patent Number: 4,904,918
[45] Date of Patent: Feb. 27, 1990

[54] POWER CONVERSION SYSTEM INCLUDING AN IMPROVED FILTER FOR ATTENUATING HARMONICS

[75] Inventors: Ronald B. Bailey; Ajith K. Kumar, both of Erie, Pa.; David L. Plette, Lyndon, Ky.

[73] Assignee: General Electric Company, Erie, Pa.

[21] Appl. No.: 322,376

[22] Filed: Mar. 13, 1989

[51] Int. Cl.$^4$ .............................................. H02P 3/18
[52] U.S. Cl. ..................................... 318/762; 363/39; 318/759
[58] Field of Search .............................. 318/759–762; 363/39

[56] References Cited

U.S. PATENT DOCUMENTS 3,691,439  9/1972  Jensen et al. ........................... 363/39
3,890,551  6/1975  Plunkett ............................... 318/376
4,093,900  6/1978  Plunkett ............................... 318/370
4,651,266  3/1987  Fujioka et al. ......................... 363/39

*Primary Examiner*—David Smith, Jr.
*Attorney, Agent, or Firm*—Albert S. Richardson, Jr.

[57] ABSTRACT

For connecting the d-c terminals of a voltage-source inverter to a direct current (d-c) power source, a d-c link capacitor is connected directly between the d-c terminals, a line capacitor is connected in parallel with the d-c link capacitor, and a series inductor is connected between the line capacitor and the source. A dynamic brake resistor and an electric power chopper are connected in series with one another across the line capacitor. Between the two capacitors, no inductance is provided but a resistor is inserted in the braking current path during electrical braking operation of the inverter.

10 Claims, 2 Drawing Sheets

POWER CONVERSION SYSTEM INCLUDING AN IMPROVED FILTER FOR ATTENUATING HARMONICS

BACKGROUND OF THE INVENTION

This invention relates to an electric power conversion system for conveying power between a direct current (d-c) power source and an electric load circuit, and, more particularly, it relates to a system of this type that includes a controllable converter and an improved electrical filter for partially isolating the converter from source transients and for attenuating harmonics developed by the system in operation.

Electric power conversion systems are used to condition the electric power supplied to motor load circuits from a d-c source of relatively constant voltage. If supplying d-c motors, such a system will include an electric power "chopper" that is suitably controlled to vary the magnitude of load current and/or voltage is desired. Alternatively, in the case of alternating current (a-c) motors, the system will include an electric power "inverter" that is suitably controlled to vary the amplitude and frequency of load voltage as desired. In either case, electric power flows from the d-c source terminals to the load terminals of the controllable converter during "motoring" operation or in a reverse direction during "electrical braking."

Such a system is useful for propelling a rapid transit vehicle, in which case the source comprises a wayside conductor and the load comprises windings of at least one traction motor whose rotatable shaft is mechanically coupled through torque-increasing gearing to an axle-wheel set of the vehicle. The wayside conductor is typically energized by a relatively low voltage d-c power generating plant located near the right of way along which the vehicle travels. In its motoring or propulsion mode of operation, the converter is so controlled that the d-c voltage applied to its source terminals is converted into adjustable voltage at its load terminals, and the traction motor(s) responds by producing torque to accelerate the vehicle or maintain its speed as desired.

In the alternative electrical braking or retarding mode of operation of the power conversion system, the converter is so controlled that each motor acts as a generator driven by the inertia of the vehicle and supplies electric power which flows in a reverse direction through the converter and appears as direct and unipolarity voltage at the source terminals. As this electrical energy is used or dissipated, the traction motor(s) responds by absorbing kinetic energy and slowing the vehicle. Electrical braking is achieved by a combination of dynamic braking and regenerative braking. Dynamic braking is effected by connecting a dynamic braking resistance between the d-c source terminals. This resistance receives current from the converter, converts the electrical energy to thermal energy, and dissipates the resulting heat. Regenerative braking, on the other hand, is effected by returning to the d-c power source power flowing in a reverse direction through the converter during braking operation. These two electrical braking modes can be combined in desired proportions, this mixing process being commonly referred to as "blending."

A power conversion system including a voltage source inverter for supplying a-c traction motors is disclosed in U.S. Pat. No. 3,890,551 - Plunkett, assigned to the assignee of the present invention and incorporated by reference in the present application. An important feature of the Plunkett power conversion system is its inclusion of ohmic resistance (shown at 28 in FIG. 1 of the Plunkett patent) that is inserted into the d-c link between the inverter and the d-c power source during electrical braking but is effectively removed from the d-c link during motoring. By inserting this series resistor during electrical braking, the magnitude of voltage at the d-c terminals of the inverter can increase above that of the source voltage. One of the advantages of thus raising the inverter voltage is to enable the traction motors to develop more magnetic flux for braking and to use less current than would otherwise be required for very high braking effort.

The power conversion system of the Plunkett patent also includes a low pass electrical filter of the conventional series inductance (L), shunt capacitance (C) type between the voltage raising resistor and the inverter for attenuating harmonics generated by operation of the inverter and for partially isolating the inverter from undesirable line transients. (As used herein, the term "harmonics" refers to various components of the composite current and voltage waveforms having frequencies that are multiples of the frequency of the fundamental component of such waveforms.) In addition, the shunt capacitance of the filter at the d-c terminals of the inverter provides the "stiff" voltage required for proper operation of a voltage source inverter.

The desired blending of dynamic and regenerative braking can be accomplished in various different ways that are well known to persons skilled in the art. See, for example, U.S. Pat. No. 4,093,900 - Plunkett. In the present state-of-the-art it is preferable to replace the parallel array of separate braking resistors and their respectively associated electromechanical switches, as shown in U.S. Pat. No. 4,093,900, with a single bank of resistance elements connected to the d-c link via an electric power chopper comprising a controllable solid-state electric valve that can be repetitively turned on and off in a pulse width modulation (PWM) mode to control the average magnitude of current in the resistor as desired. An example of this modern practice is disclosed in U.S. Pat. No. 4,761,600 - D'Atre et al, where the electric valve comprises a main thyristor or silicon controlled rectifier (SCR) and an auxiliary thyristor for commutating the main SCR from a conducting state (on) to a non-conducting or current blocking state (off). Alternatively, a solid-state gate turn-off device (GTO) could be substituted for the chopper shown in U.S. Pat. No. 4,761,600.

SUMMARY OF THE INVENTION

A general objective of the present invention is to provide, in an electric power conversion system of the general type disclosed by Plunkett, a filter wherein the required inductance and capacitance means are interconnected and arranged in an improved and synergistic manner that saves space, weight and costs and/or that enhances reliability.

Another objective is to provide an improved filter capable of fulfilling the immediately-preceding objective and of enabling the voltage raising resistor that is inserted in the d-c link to provide beneficial damping to the filter transfer function that is in effect when the power conversion system is operating in the electrical braking mode.

Still another objective is to provide a relatively compact and low cost filter capable not only of effectively attenuating harmonics generated by converter operation but also capable of effectively attenuating harmonics generated by operation of a chopper that controls the current flowing through the above-mentioned dynamic braking resistance during electrical braking.

In carrying out the invention in one form, a set of load terminals on the motor side of a controllable converter is adapted to be connected to at least one electric motor, and means is provided for connecting a pair of source terminals of the converter to a d-c power source via an electrical filter that attenuates harmonics generated during motoring and electrical braking operation of the converter. The filter comprises: (1) line-filter inductance means connected in the current path between the d-c source and the converter, (2) first capacitance means directly connected between the source terminals of the converter, (3) second capacitance means, and (4) interconnecting means characterized by the absence of appreciable inductance for connecting the second capacitance means in parallel with the first capacitance means. A dynamic braking circuit is connected across the second capacitance means and comprises the series combination of a dynamic braking resistance and an electrical power chopper that can be repetitively turned on and off during electrical braking to control current in such resistance. The interconnecting means of the aforesaid filter includes additional ohmic resistance means in the path of current between said two capacitance means so that during electrical braking a substantially higher voltage is developed across the first capacitance means than across said second capacitance means. This additional resistance means is effectively removed from the interconnecting means during motoring operation. The capacitance value of the second capacitance means is selected to attenuate harmonics generated by operation of the chopper during electrical braking.

For a better understanding of the invention, reference may be had to the following detailed description taken in conjunction with the accompanying drawings.

DETAILED DESCRIPTION

Figure 1:
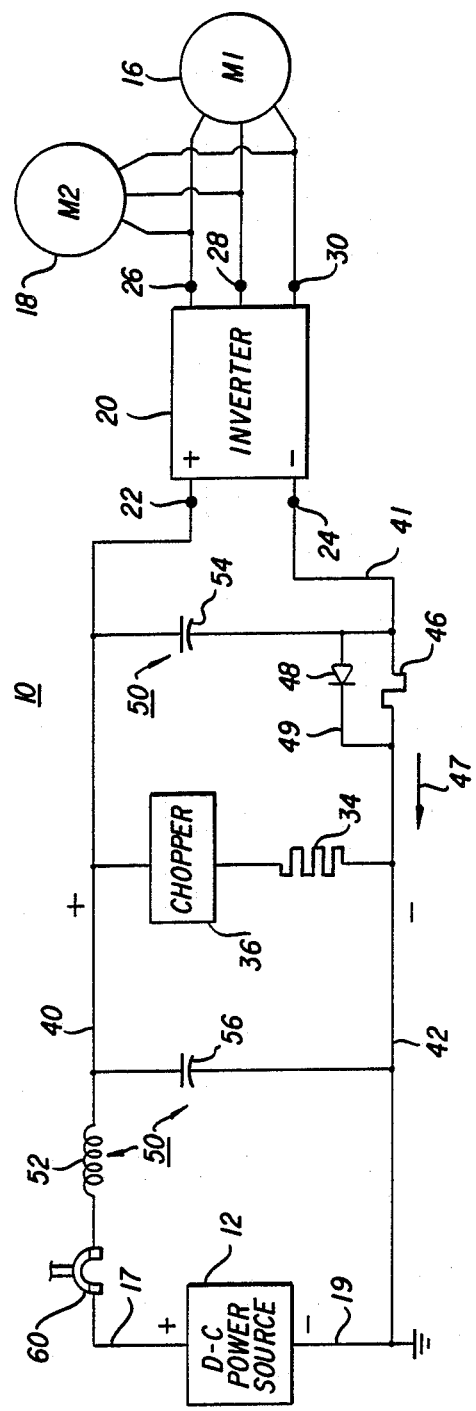
FIG. 1 is a schematic circuit diagram of one embodiment of the invention.

Referring now to FIG. 1, there is shown a power conversion system 10 for conveying power between a d-c power source 12 and an electric load comprising first and second motors 16 and 18 electrically connected in parallel. In one application of the invention, the motors 16 and 18 are three-phase a-c induction-type traction motors used for propelling a transit vehicle (not shown), and the d-c source 12 comprises a wayside power distribution system including either a third rail or an overhead catenary with which a current collector on the vehicle makes sliding or rolling contact. In FIG. 1, the relatively position line 17 represents such a current collector, and the negative line 19 represents a conductor in contact with a grounded rail serving as the other terminal of the d-c source. Alternatively, the power conversion system 10 on board the vehicle may be connected to the source via a two-wire trolley in contact with two parallel conductors of an overhead catenary.

The magnitude of the unipolarity voltage between the lines 17 and 19 is typically in a range from 600 volts normal to 800 volts maximum, and each of the motors 16 and 18 typically has a full-load rating on the order of 300 horsepower more or less.

The power conversion system 10 includes a controllable converter 20 which, in the illustrated embodiment of the invention, is a voltage source inverter having a pair of d-c terminals 22 and 24 on its source side and a set of three a-c terminals 26, 28 and 30 on its motor side. The d-c terminal 22 is connected via a conductor 40 to the line 17 of positive potential, and the terminal 24 is connected via relatively negative conductors 41 and 42 to the other line 19 of the d-c power source 12. The conductors 40-42 thus serve as a d-c link between the source 12 and the inverter 20. The a-c terminals 26, 28 and 30 are respectively connected to the three different phases of each of the a-c motors 16 and 18.

During motoring, i.e. when electrical power is being conveyed from the source to the motors, direct current is supplied to the inverter through its d-c terminals 22 and 24, and the inverter acts to convert this direct current into alternating current supplied through a-c terminals 26, 28 and 30 to the motors 16 and 18. The inverter is of a conventional design and includes suitable controls (not shown in FIG. 1) for varying the amplitude and frequency of the alternating voltage at its a-c terminals to provide the needed acceleration or deceleration of the vehicle driven by the motors 16, 18. The well known pulse-width modulated (PWM) control strategy can be used. Examples of useful inverters are disclosed in U.S. Pat. Nos. 3,890,551 and 4,761,600. In modern practice, GTO devices are preferred as the main controllable electrical valves of the inverter, thereby avoiding the need for auxiliary thyristors and commutation circuits. The power conversion system 10 has alternative motoring and electrical braking modes of operation. During electrical braking, each of the motors 16 and 18 operates as an electrical generator driven by the inertia of the transit vehicle, returning power to the system 10. This return power flows through the inverter 20 in a reverse direction from the direction of flow during motoring and appears an unipolarity voltage and direct current at the d-c terminals 22 and 24.

The conversion system 10 is designed to provide for both dynamic braking and regenerative braking. Dynamic braking is effected by connecting across the conductors 40 and 42 of the d-c link a dynamic braking resistance 34 through which at least some of the braking current can be made to flow, thus dissipating electric energy in the form of heat. For controlling current in the resistance 34 an electric power chopper 36 is connected in series therewith. As is well known to persons skilled in the art, the chopper 36 is a solid-state switch that can be repetitively turned on and off by suitable control means (not shown in FIG. 1) that, in one form, controls the ratio of the "on time" to the "off time" during successive intervals each of fixed duration. The average magnitude of current in the resistance varies directly with this ratio.

Regenerative braking is effected by returning reversely-flowing power to the d-c source 12. During this mode of braking, braking current from the d-c terminals 22 and 24 flows through the source 12 via the d-c link conductors 40, 41 and 42. Regenerated power can be used for propelling other vehicles connected to the wayside conductor and then drawing power from the same source. But, as noted in U.S. Pat. No. 4,093,900, there are many instances when a power source is not receptive enough to use all of the electrial braking energy, and in such instances some energy must be dissipated in the dynamic braking resistance 34. The chopper control is able to sense such conditions and to respond by varying the on-off ratio of the chopper appropriately. One approach for controlling electrical braking is to use only the regenerative braking mode as long as the resulting braking effort is sufficient but to blend in dynamic braking effort when regenerative braking effort drops below the desired level.

For increasing the effectiveness of the braking action, additional ohmic resistance means 46 is connected between the two negative conductors 41 and 42 on one side of the d-c link so that it is in the path of current flowing from the relatively negative line 19 of the d-c power source 12 and/or the dynamic braking circuit 34, 36 to the negative d-c terminal 24 of the inverter during electrical braking. This resistance means 46 is shunted by a bypass circuit 49 including suitable means 48, such as the illustrated diode, for effectively removing the resistor 46 from the d-c link during monitoring (i.e. when current in the conductors 41 and 42 flows in the direction of arrow 47 from the negative d-c terminal 24 of the inverter 20 to the negative line 19 of the source 12). The diode 48 in the bypass circuit 49 is poled, as is shown in FIG. 1, to present negligible resistance to current in the direction of the arrow 47, but during electrical braking it blocks current which now flows in an opposite direction through conductors 41 and 42, thereby forcing such current to flow through the resistor 46. By thus effectively inserting the resistor 46 into the path of braking current, the voltage developed between the d-c terminals 22 and 24 of the inverter will have a substantially higher magnitude than the voltage between conductors 40 and 42 of the d-c link. Consequently, the amplitude of the motor voltage will rise above the magnitude of source voltage when the motors are acting as generators during electrical braking.

Such increased voltage is highly advantageous because it enables the motors to develop more flux for braking, and very high braking effort can be obtained with less current than would otherwise be possible. In a typical transit vehicle, the peak braking power will be much higher than the maximum power for propulsion. Keeping the maximum current as low as possible during braking has the additional benefit of avoiding the need for larger diameter and more expensive solid-state electrical valves in the inverter 20. This action and its other advantages are explained in more detail in the previously referenced U.S. Pat. No. 3,890,551. It is apparent that the extra resistor 46 will always absorb a portion of the electrical braking power even when the source 12 is highly receptive and there is no current in the dynamic braking circuit 34, 36. During regenerative braking the resistor 46 provides an additional benefit: it helps to isolate the inverter 20 from the voltage between the lines 17 and 19, which voltage may experience sudden magnitude swings in either a positive or negative direction and lasting for many milliseconds due to lightning strokes, opening and closing of line breakers, or the like. The presence of the resistor 46 gives the inverter control circuits some additional time to respond to these sudden voltage changes in a safe and controlled manner.

For attenuating harmonics generated by operation of the power conversion system 10 and for effectively isolating the system from any undesirable electrical transients in the d-c power source 12, a single-stage electrical filter 50 of the L-C type is included in the connections between the source 12 and the inverter 20. This filter 50 comprises a series line-filter inductance means 52 conneted in the path of current between the line 17 and the positive conductor 40 of the d-c link, and shunt capacitance means 54, 56. In accordance with the present invention, the shunt capacitance means actually comprises two separate, parallel banks of capacitors. The first capacitance means 54 (referred to as the d-c link capacitor) spans the conductors 40 and 41 and thus is directly connected between the two d-c terminals 22 and 24 of the inverter. The second capacitance means 56 (referred to as the line capacitor) spans the conductors 40 and 42 and thus is interconnected in parallel with the capacitance means 54 via a circuit that includes the additional resistor 46 and its bypass circuit 49. During motoring, the bypass circuit around the resistor 46 is in its low resistance state as described above, essentially the same voltage is applied across both of the capacitors 54 and 56, and the effective value of capacitance in the filter 50 is the sum of the capacitance values of the capacitors 54 and 56. But during electrical braking (when braking current is flowing in a direction opposite to the arrow 47), the resistor 46 is inserted in the path of braking current between the line capacitor 56 and the d-c link capacitor 54, and the voltage magnitude across the former capacitor will now be less than the voltage across the capacitor 54 by an amount equal to the voltage drop across resistor 46.

In either mode of operation, the filter 50 serves to attenuate harmonics generated by operation of the inverter 20 so that such harmonics are isolated from the d-c source 12 and will not interfere with the usual wayside signaling system. During motoring, the d-c link capacitor 54 serves mainly as the required "stiff" voltage source for the inverter 20. In the electrical braking mode of operation, the line capacitor 56 serves mainly as a filter for the chopper 36, providing a temporary path for braking current during the off periods of the chopper in the dynamic braking circuit 34, 36 which, as can be seen in FIG. 1, is connected across this capacitor. In addition to attenuating chopper-generated haronics, the filter 50 cooperates with the resistor 46 to damp the inverter-generated harmonics during electrical braking.

An important advantage of inserting the resistor 46 between the two capacitors 54 and 56 during electrical braking is that its presence enables the voltage between the inverter terminals 22 and 24 to rise to a desired high magnitude during this interval without subjecting the line capacitor 56 to this elevated voltage. As a result, only the d-c link capacitor 54 needs to have the capability of sustaining this higher voltage. The line capacitor 56 has a significantly lower voltage rating, whereby it is smaller, less expensive and more reliable than would be true if the higher voltage rating were required. In one application of this circuit, the magnitude of voltage at the d-c terminals 22, 24 can rise to a maximum of about 1200 volts during electrical braking, whereas the maximum voltage across capacitor 56 is only about 800 volts. With the resistor 46 being connected between the negative d-c terminal 24 of the inverter 20 and the negative line 19 of the source 12, the potential on the terminal 24 during electrical braking is negative relative to ground by an amount equal to the voltage drop across the resistor 46, and the positive potential on the other inverter terminal 22 will rise above ground by an amount equal to, but not more than, the magnitude of source voltage, whereby the benefits of increased motor voltage during braking are obtained without the detriment of excessive electrical stress on the insulation systems of the motors 16 and 18.

In accordance with the present invention, the means for interconnecting the parallel capacitors 54 and 56 of the single-stage L-C filter 50 has no appreciable inductance. To this end, no inductor or reactor is deliberately or intentionally inserted between these two capacitors. Of course, there is a small amount of distributed inductance due to the layout of the cables or bus bars that interconnect the two capacitors and the additional resistor 46 and diode 48, but such inherent inductance has insufficient value (less than approximately five microhenrys) to appreciably smooth the undulating current in the d-c link 40–42. Stated another way, the inductance in the interconnecting means is less than the value of inductance required effectively to attenuate the ripple amplitude or harmonics in the d-c link current. Limiting the inductance to a low value minimizes circulating currents between the two capacitors by keeping circuit resonance well above any ambient disturbance frequency. While substantially higher inductance in the interconnecting means could keep the circuit resonance well below such disturbance frequency and therefore would also serve to inhibit undesirable circulating currents, it would add undesirable weight, size and cost.

In the presently preferred embodiment of the invention, the line capacitor 56 has a substantially higher capacitance value than the d-c link capacitor 54. For example, the line capacitor 56 could typically have a value of about 58,000 microfarads as compared to a value of less than about 9,000 microfarads for capacitor 54, or many times more capacitance. A typical inductance value for the line-filter inductance means 52 of the L-C filter 50 is about 400 microhenrys, and a typical ohmic value of the additional resistor 46 is about 0.75 ohm.

In a practical embodiment of the invention, the line capacitor 56 actually comprises a bank of 40 individual capacitor units (or cans) arranged in 20 parallel branches, each branch containing two units in series, with each unit having a capacitance value of about 5,800 microfarads, a voltage rating of 450 volts, and a current rating of 18 amps r.m.s. The d-c link capacitor 54 actually comprises a bank of 24 capacitor units (or cans) arranged in six parallel branches, each branch containing four units in series, with each of these units having a capacitance value of about 5,800 microfarads, a voltage rating of 450 volts, and a current rating of 18 amps r.m.s.

Although the capacitor bank forming the second capacitance means 56 has a much higher capacitance value than the capacitor bank forming the first capacitance means 54, it uses only one-fourth the number of capacitor units as would be required if it had to withstand the same maximum voltage as the first capacitor bank (54). This is due to the resistor 46 inserted between the two capacitor banks during electrical braking, whereby the magnitude of voltage across the second capacitor bank (56) will not exceed the level of source voltage between lines 17 and 19 even though the magnitude of voltage at the d-c terminals 22, 24 of the inverter 20 is higher. In addition, the resistor 46 is believed to cooperate with the two capacitors 54 and 56 to provide beneficial damping to the filter transfer function in effect during electrical braking. This should make the system inherently easier to stabilize with little increase in complexity or component cost.

For disconnecting the power conversion system 10, an electric circuit breaker 60, applied in a conventional manner, is provided between the system and the d-c power source. This circuit breaker 60 is operated from its closed position shown to an open position in response to a fault or whenever the system 10 needs to be isolated from the source 12.

Figure 2:
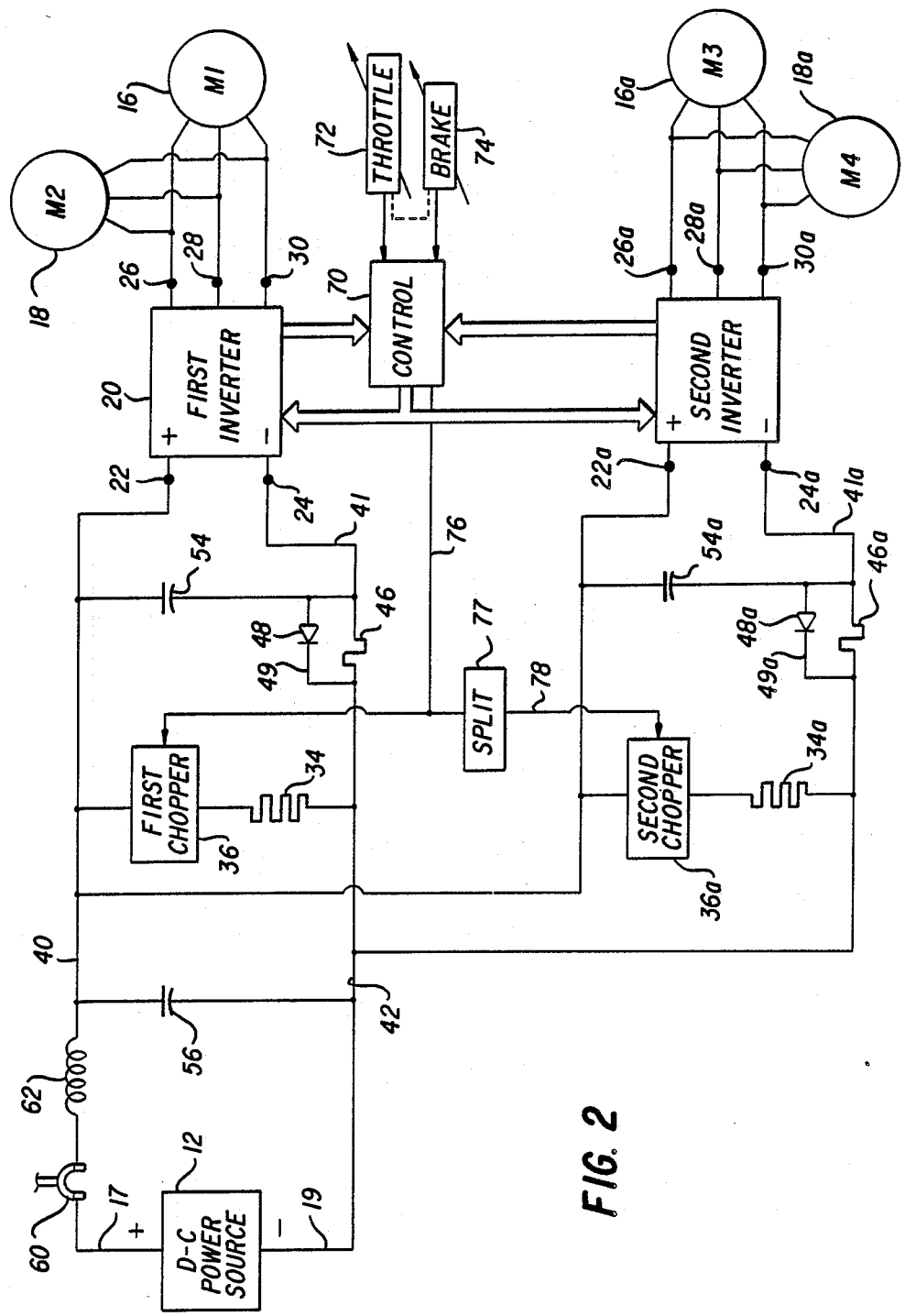
FIG. 2 is a schematic circuit diagram of another embodiment of the invention.

In a typical transit vehicle, there will be a second voltage source inverter, in addition to the inverter shown in FIG. 1, for supplying alternating current to two more traction motors for propelling the vehicle. FIG. 2 illustrates a power conversion system including such an additional inverter and with third and fourth a-c motors being connected to the set of the a-c terminals on its motor side. In FIG. 2, components common to those shown in FIG. 1 and described above are designated by the same reference numerals used in FIG. 1, and corresponding added components are designated by the same reference numerals plus the suffix "a."

Referring now to FIG. 2, the positive d-c terminal 22a on the source side of the second inverter 20a is connected, via the conductor 40 of the d-c link, to the line 17 of positive potential, and the relatively negative d-c terminal 24a is connected, via a separate conductor 41a and the common conductor 42, to the other line 19 of the d-c power source 12. The a-c terminals 26a, 28a and 30a of the inverter 20a are respectively connected to three different phases of each of the a-c motors 16a and 18a. A second d-c link capacitor 54a individually associated with the inverter 20a is directly connected between the d-c terminals 22a and 24a, and a line capacitor 56 shared by both of the inverters 20 and 20a and both of the choppers 36 and 36a spans the conductors 40 and 42 of the d-c link where it is effectively in parallel circuit relationship with the two d-c link capacitors 54 and 54a during the motoring mode of operation of the FIG. 2 conversion system.

As is shown in FIG. 2, a second dynamic braking circuit, comprising the series combination of another dynamic braking resistor 34a and a second electric power chopper 36a, is connected between the d-c link conductors 40 and 42 and hence across the line capacitor 56. A second additional ohmic resistance means 46a bypassed by a diode 48a is connected in the path of current between the capacitors 54a and 56. The diode 48a is poled to conduct d-c link current during motoring, thereby effectively short circuiting the resistor 46a. But it blocks current during electrical braking so that the resistor 46a is then inserted in the braking current path and causes a substantially higher voltage to develop across the d-c link capacitor 54a than across the line capacitor 56. As before, the current path between the capacitors 54a and 56 is characterized by the absence of appreciable inductance.

In addition to sharing the common shunt line capacitor 56, the two inverters 20 and 20a utilize the same series line-filter inductance means 62 which is connected on the d-c power source side of the capacitor 56 between the d-c link conductor 40 and the line 17. The line-filter inductance means 62 in FIG. 2 has the same inductance value as the line-filter inductor 52 of the FIG. 1 embodiment, but its current rating is higher.

The two inverters 20 and 20a are controlled from a common control means 70 which responds to alternative command signals from interlocked throttle and brake controllers 72 and 74, respectively. The control means 70 also receives feedback signals representative of sensed values of voltage, current, and other selected variables in each of the inverters 20 and 20a. To operate in a dynamic braking mode, the control means 70 derives a train of suitably timed periodic signals that determine the repetitive on and off intervals of the choppers 36 and 36a, and it varies the ratio of these intervals as desired. This signal train is fed over a line 76 to the first chopper 36 and also to suitable means 77 for splitting it into a separate train of periodic signals that are displaced from the signals of the original train on the line 76 by a length of time corresponding to approximately one-half the period of such signals. The separate signal train is fed over a line 78 to the second chopper 36a. In this manner the two choppers are coordinated so as to operate alternately rather than in unison. That is, the "on" periods of chopper 36a are staggered in time with respect to the "on" periods of chopper 36. This staggering reduces the amplitude and increases the frequency of the braking current traversing the line capacitor 56, thereby making it much easier for this capacitor, which is then acting as a filter for attenuating the harmonics generated by operation of both of the choppers, to perform its filtering function.

In the FIG. 1 embodiment, where there are two motors and one chopper, the dominant frequency of the current through the line capacitor 56 during dynamic braking is the same as the fundamental operating frequency of the chopper 36 (e.g. 200 Hz). But in the FIG. 2 embodiment, where the total magnitude of braking current is doubled but two choppers are operating in a staggered relationship, the line capacitor 56 sees only half the total current at a doubled frequency, and thus it can more effectively perform its desired function. As a result, the capacitance value of the common line capacitor 56 in FIG. 2 can be the same as that of the capacitor 56 in FIG. 1 to perform the required filtering action.

In the FIG. 2 embodiment, the individual series resistance means 46 and 46a serve an additional beneficial function. They help to isolate or buffer the inverters 20 and 20a from each other, particularly during electrical braking, thus reducing the risk of undesirable interference between the two inverters, a condition which might otherwise be caused by the charging and discharging of the common line filter capacitor 56.

The above-described embodiments of the invention are illustrative only, and various changes and modifications can be made without departing from the invention in its broader aspects. One such change is that the additional resistor 46 and its bypass circuit 49 can be located in the relatively positive d-c link conductor 40 between the capacitors 54 and 56 instead of being associated with the negative sides of these capacitors as is shown in FIG. 1. Additional changes and modifications will be apparent to those skilled in the art, and the concluding claims are therefore intended to cover all such changes and modifications as fall within the true spirit and scope of the invention.

We claim:

1. An electric power conversion system for conveying power between a d-c power source and an electric motor, comprising:
   a. an electric power converter having a set of load terminals on its motor side for connection to at least one motor and a pair of d-c terminals on its source side, said converter having alternative motoring and electrical braking modes of operation;
   b. means for connecting said d-c terminals to a d-c power source;
   c. said connecting means including an electrical filter for attenuating harmonics generated by operation of said converter during motoring and electrical braking, said filter comprising:
      (i) line-filter inductance means connected in the path of current between said source and said converter,
      (ii) first capacitance means directly connected between said d-c terminals,
      (iii) second capacitance means, and
      (iv) interconnecting means characterized by the absence of appreciable inductance for connecting said second capacitance means in parallel with said first capacitance means;
   d. dynamic braking circuit connected across said second capacitance means and comprising the series combination of a dynamic braking resistance and an electric power chopper that can be repetitively turned on and off during electrical braking to control current in said dynamic braking resistance;
   e. said interconnecting means of said filter including additional ohmic resistance means in the path of current between said first and second capacitance means so that during electrical braking a substantially higher voltage is developed across said first capacitance means than across said second capacitance means; and
   f. means for effectively removing said additional resistance means from said interconnecting means during the motoring mode of converter operation.

2. The system of claim 1 in which said second capacitance means has a substantially higher capacitance value than said first capacitance means and is effective to attenuate harmonics generated by operation of said chopper during electrical braking.

3. The system of claim 1 in which said connecting means includes relatively positive and negative conductors, and said resistance means is so located that during electrical braking the potential of the relatively negative one of said pair of d-c terminals is negative with respect to the potential of said negative conductor by an amount equal to the voltage drop across said resistance means.

4. The system of claim 1 in which said motor is an a-c motor and said converter is a voltage source inverter.

5. A power conversion system as defined in claim 4 and further comprising:
   a. a second voltage source inverter having a set of load terminals on its motor side for connection to another a-c motor and having a separate pair of d-c terminals on its d-c source side;
   b. means for connecting said separate pair of d-c terminals to said d-c power source, the latter means including:
      (i) third capacitance means directly connected between the d-c terminals of said second inverter, and
      (ii) second interconnecting means characterized by the absence of appreciable inductance for connecting said third capacitance means in parallel with said second capacitance means;
   c. a second dynamic braking circuit connected across said second capacitance means and comprising the series combination of a second dynamic braking resistance and a second electric power chopper that can be repetitively turned on and off during electrical braking to control current in said second dynamic braking resistance;

d. said second interconnecting means including second additional ohmic resistance means in the path of current between said second and third capacitance means so that during electrical braking a substantially higher voltage is developed across said third capacitance means than across said second capacitance means; and f. means for effectively removing said second additional resistance means from said second interconnecting means during the motoring mode of operation.

6. The system of claim 5 in which said interconnecting means are so arranged that the first-mentioned resistance means is associated with the relatively negative sides of said first and second capacitance means and said second resistance means is associated with the relatively negative sides of said second and third capacitance means.

7. The system of claim 5 in which each of said means for removing additional resistance means is a diode connected across the associated resistance means to conduct current during motoring and to block current during electrical braking.

8. The system of claim 5 in which said line-filter inductance means is connected on the d-c source side of said second capacitance means.

9. The system of claim 5 in which said choppers are so controlled that the "on" periods of each chopper are staggered in time with respect to the "on" periods of the other chopper 10. The system of claim 9 in which the capacitance of said second capacitance means is substantially higher than the sum of the capacitances of said first and third capacitance means, and said second capacitance means is effective to attenuate harmonics generated by the staggered operation of said choppers during electrical braking.

* * * * *